Nov. 11, 1947.  R. S. BOHANNAN  2,430,702
WEIGHING SCALE
Filed Jan. 12, 1944  2 Sheets-Sheet 1
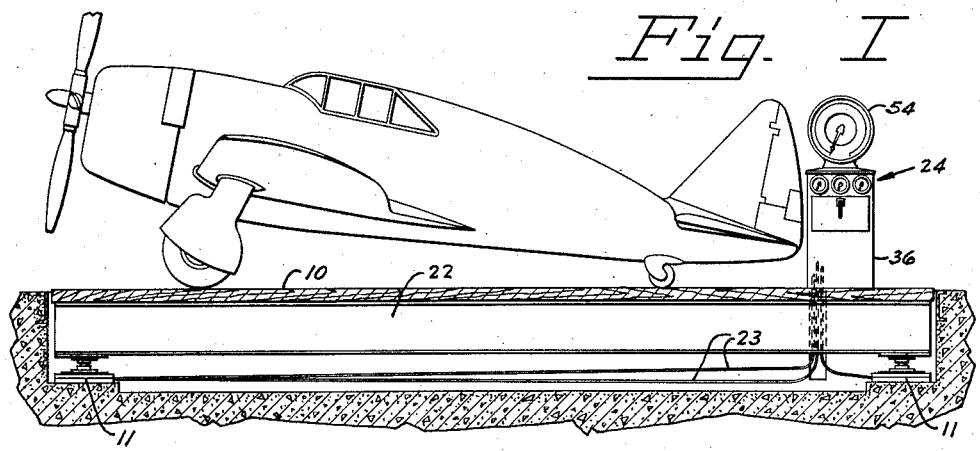
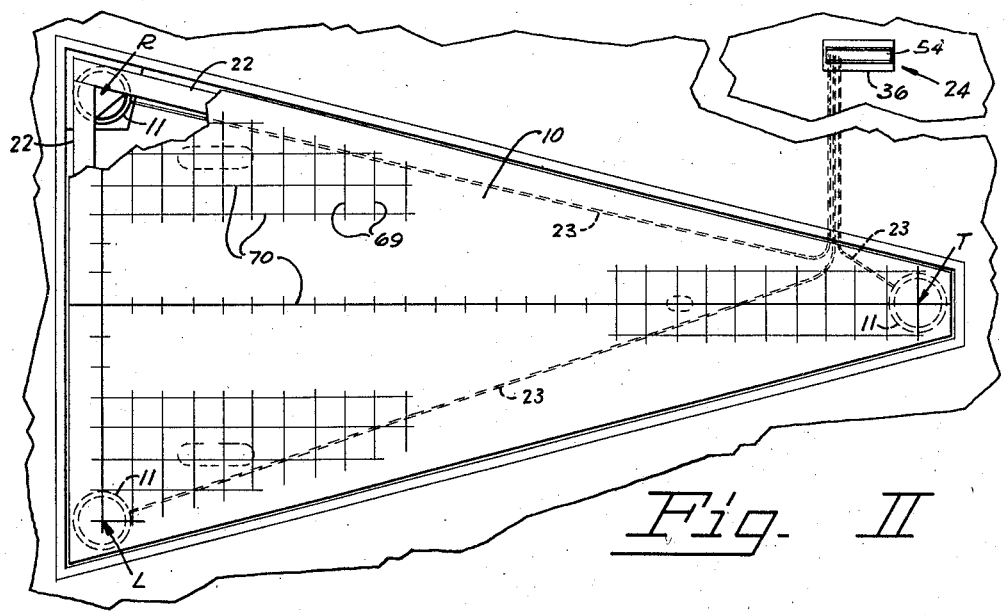
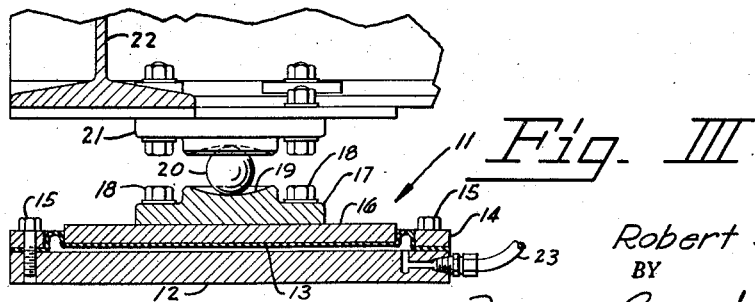
INVENTOR.
Robert S. Bohannan
BY
Marshall & Marshall
ATTORNEYS

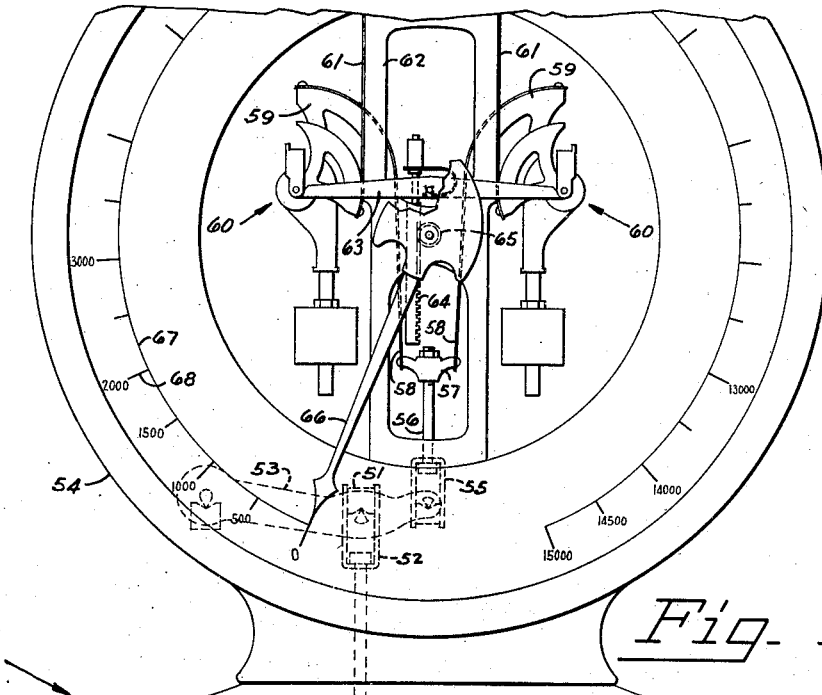
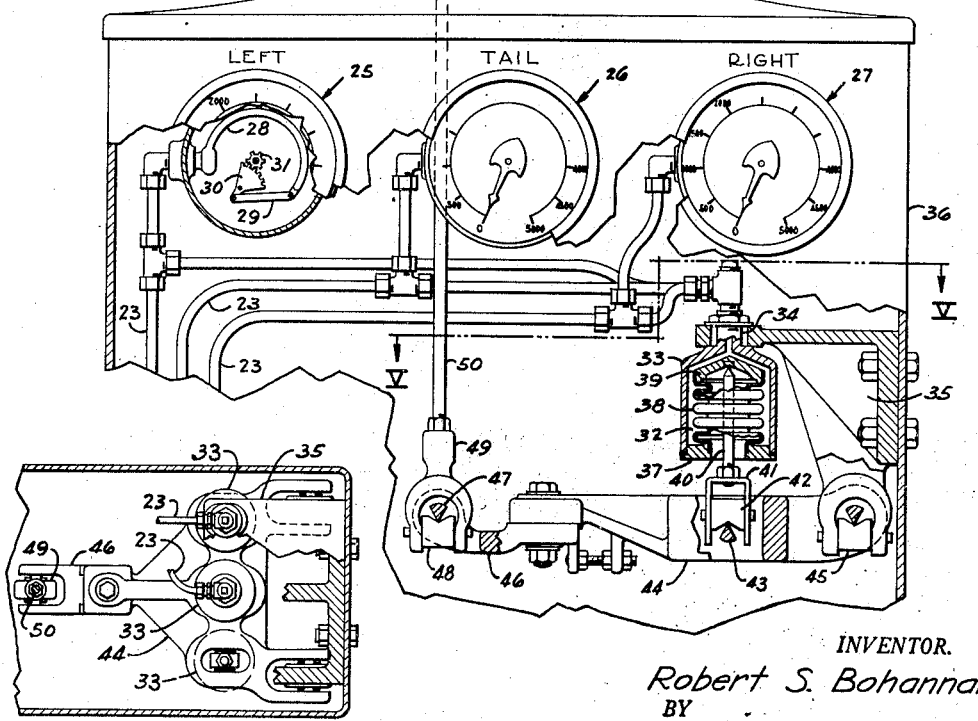

Patented Nov. 11, 1947

2,430,702

UNITED STATES PATENT OFFICE 2,430,702

WEIGHING SCALE

Robert S. Bohannan, Birmingham, Ala., assignor to Toledo Scale Company, Toledo, Ohio, a corporation of New Jersey Application January 12, 1944, Serial No. 517,934

1 Claim. (Cl. 73—65)

This invention relates to weighing scales adapted to determine the weight of a load and the horizontal position of its center of gravity. This application is a continuation-in-part of application for patent Ser. No. 396,251, filed June 2, 1941.

It is customary when loading an airplane to distribute the load in such a manner that the center of gravity of the plane will not be shifted. This is necessary to insure that the plane will be stable in flight. The position of the center of gravity after loading is ordinarily determined by calculation from the weight distribution obtained by weighing each of the wheels individually. Three scales are ordinarily employed and because the indication of each scale is independent of the position of the wheel resting thereon, it is necessary to determine the position of the center of pressure of each wheel on its scale to establish reference points from which the position of the center of gravity of the plane may be measured. Because of the size of the area of contact of the tire on the wheel with the platform it is difficult to precisely determine the center of pressure, and as a result there is considerable uncertainty in the resulting center of gravity measurement.

It is an object of this invention to provide a weighing scale which on a single platform will give not only the total weight but also the position of the center of gravity of the load.

Another object is to provide a weighing scale incorporating hydraulic force transmitting elements which allow the indicating mechanism to be located remotely from the platform.

A still further object is to provide simultaneous indication of the total load and the load carried by each of the corners of the load receiver.

Another object is to provide indicia on a weighing scale platform which in combination with the total load and the load on each corner may be used to locate the center of gravity of the load.

More specific objects and advantages are apparent from the description, in which reference is had to the accompanying drawings illustrating a preferred form of scale embodying the invention.

In the drawings:

Figure I is a front elevation of a weighing scale embodying the invention.

Figure II is a plan view of the scale illustrated in Figure I showing the position of the load supporting capsules and the platform indicia.

Figure III is a detailed vertical section of one of the load supporting capsules.

Figure IV is a front elevation, partly in section, of the load counterbalancing and indicating mechanism.

Figure V is a fragmentary sectional view taken substantially along the line V—V of Figure IV.

These specific drawings and the specific description that follows merely disclose and illustrate the invention and are not intended to impose limitations upon the claim.

A platform 10 of substantially triangular shape is supported on three hydraulic capsules 11, one of the capsules being located under each vertex of the platform 10. Each of the capsules 11 comprises a flat circular base plate 12, a flexible diaphragm 13 overlying the base plate 12 and clamped to the base plate 12 by means of an annular ring 14 secured by a series of bolts 15. The flexible diaphragm 13 forms with the base plate 12 a chamber adapted to contain hydraulic fluid. A pressure plate 16 overlies and is supported by the diaphragm 13 and serves to distribute the load over the major portion of the diaphragm 13. A low pedestal 17 is secured by bolts 18 to the center of the upper surface of the pressure plate 16. The top of the pedestal 17 is dished to form a concave recess 19 adapted to receive a load supporting ball 20. A similar pedestal 21 in inverted juxtaposed position is attached to the lower side of the girders 22 which support the platform 10. The inverted pedestal 21 is also provided with a concave spherical recess on its lower surface to cooperatively engage the ball 20. This construction allows the platform a limited amount of substantially horizontal movement without stressing or damaging the capsules 11.

The force created by the platform and the load thereon is transmitted through the balls 20 and the pedestals 17 and 21 to the pressure plates 16 resting on the diaphragms 13. This load is carried by hydraulic fluid confined under the diaphragm 13 and the resulting hydraulic pressure is transmitted through tubes 23 to a load counterbalancing and indicating mechanism 24. The loads on the corners of the platform 10 are indicated on Bourdon tube pressure gauges 25, 26 and 27 connected one to each of the capsules 11 by the tubes 23. Each of these gauges is of conventional construction in which the applied pressure tends to straighten a curved, elliptical cross-section tube 28 and the resulting motion of the closed end of the tube 28 is transmitted through a link 29, a toothed sector 30 and a pinion 31 to the instrument pointer.

The pressure tubes 23 from the capsules 11 are also connected to pressure responsive chambers 32. Each of the chambers 32 comprises an inverted cup-shaped housing 33, the upper portion of which is necked down to form a tenon 34 by means of which the housing 33 is mounted in a bracket 35 secured to the side of a cabinet 36, which houses the counterbalancing and indicating mechanism. The bottom of the cup-shaped housing 33 is closed by a threaded ring 37 to the inner edge of which is secured a bellows 38 extending upwardly within the housing 33. The upper end of the bellows is sealed by a cap 39. In this arrangement hydraulic pressure applied to the interior of the cup-shaped housing 33 tending to collapse the bellows 38 exerts force on a strut 40 engaging the underside of the bellows cap 39. The lower end of the strut 40 comprises a yoke 41 containing a bearing 42 which rests on a knife edge 43 of a gathering lever 44 which is fulcrumed on bearings 45 mounted in depending portions of the bracket 35. Load on the capsules 11 is thus transmitted by hydraulic pressure and applied as a proportional force to the gathering lever 44.

The lever 44 is provided with a nose iron 46 incorporating a power pivot 47 which engages bearings 48 mounted in a stirrup 49 at the lower end of a steelyard rod 50. Bearings 51 in a yoke 52 at the upper end of the steelyard rod 50 transmit force to a pendulum lever 53 fulcrumed near the rim of a substantially watchcase-shaped housing 54. The pendulum lever 53 is connected through a stirrup 55, a rod 56, and a yoke 57 to a pair of metallic ribbons 58 which overlie and are attached to power sectors 59 of load counterbalancing pendulums 60. The pendulums 60 are supported by metallic ribbons 61 depending from the top and lying along the sides of a vertical frame 62 mounted within the housing 54. Force from the load applied through the yoke 57 and ribbons 58 causes the pendulums 60 to rise, and the resulting motion is transmitted through compensating bars 63, a rack 64 and a pinion 65 to an indicator 66 which is adapted to sweep over a chart 67, and by cooperation with indicia 68, to indicate the load being counterbalanced.

Because the load supporting capsules acting through their associated pressure receiving chambers 32 act jointly on the gathering lever 44, the force counterbalanced by the pendulums 60 and indicated by the indicator 66 is proportional to the total load on the platform. Simultaneously the Bourdon tube gauges 25, 26 and 27, being connected to individual capsules, indicate the load supported by each of the capsules individually.

The platform 10 is substantially of the form of a short base isosceles triangle adapted to support an aircraft with the landing wheels located near the base of the triangle and the tail wheel near the vertex. With this arrangement the capsules 11 under the ends of the base of the triangle may be designated as L and R, left and right, as seen from an airplane located on the platform and the other capsule under the vertex may be designated as T, for tail.

For convenience in locating the center of gravity the surface of the platform 10 is provided with indicia 69 and 70. The indicia 69 comprise a series of lines drawn parallel to the base of the triangle at uniformly successive distances from the axis through the centers of the capsules L and R. The indicia 70 comprise a series of parallel lines spaced at uniformly successive distances from the capsule L and lying perpendicular to the indicia lines 69. The indicia 69 and 70 thus form a rectilinear co-ordinate system on which the center of gravity may be located. The co-ordinates of the center of gravity may be determined as follows:

The longitudinal co-ordinate to be measured on the indicia 69 is equal to the product of the load supported by the capsule T times the distance from the base of the triangle to the capsule T divided by the total load. This quotient gives the longitudinal position of the center of gravity as measured from the base of the triangle and may be located with the aid of the indicia 69.

The transverse position of the center of gravity is determined by taking moments about an axis through the load supporting capsule L perpendicular to the base of the triangle. The sum of the products of the load supported by the capsule R times the distance between the capsules L and R plus half the product (since the altitude of an isosceles triangle bisects the base) of the load supported by the capsule T times the distance between the capsules L and R divided by the total load gives the distance of the center of gravity from the axis through the capsule L and may be located by the aid of the indicia 70.

This determination of the center of gravity is with respect to the platform rather than the airplane itself and the point thus located on the indicia 69 and 70 is the point exactly below the plane's center of gravity. This measurement may be transferred to the plane by any of several well known methods such as a plumb bob or a vertical sight tube. The determination made in this way is particularly accurate because the position of the co-ordinate system on the platform may be precisely determined from the center lines of the load supporting balls 20. The area of contact of the landing wheels or any deformation in the landing gear of the plane does not affect the measurement in any way.

While the structure has been shown in connection with a scale for weighing airplanes, the principle involved, that of measuring the total load and the load supported by each of the corners may be applied to the determination of the center of gravity of other objects.

Having described the invention, I claim:

In a weighing scale for simultaneously indicating the gross weight of an airplane, and the distribution of the weight of such airplane, in combination, a platform for supporting said airplane, said platform having locating indicia for centering said airplane thereon, a hydraulic force transmitting system comprising a capsule supporting each corner of said platform, a pressure indicator having indicia in terms of weight associated with each of said capsules, a pressure receiver associated with each of said capsules and a tube connecting each of said capsules with one of said pressure indicators and with one of said pressure receivers, force counterbalancing and indicating mechanism and a pivotally mounted lever for additively combining the pressures received in all of said pressure receivers and for transmitting said added pressures to said force counterbalancing and indicating mechanism.

ROBERT S. BOHANNAN.

REFERENCES CITED

The following references are of record in the file of this patent:

UNITED STATES PATENTS

| Number | Name | Date |
|---|---|---|
| 2,052,116 | Strauss | Aug. 25, 1936 |
| 2,125,483 | Blanchard | Aug. 2, 1938 |
| 2,313,509 | Bohannan | Mar. 9, 1943 |
| 566,698 | Raab | Aug. 25, 1896 |
| 1,218,253 | Gordon | Mar. 6, 1917 |
| 1,887,992 | Casler | Nov. 15, 1932 |
| 2,166,153 | Huck | July 18, 1939 |
| 2,255,814 | Roche | Sept. 16, 1941 |
| 2,330,797 | Bohannan | Oct. 5, 1943 |
| 2,336,142 | Watson | Dec. 7, 1943 |

FOREIGN PATENTS

| Number | Country | Date |
|---|---|---|
| 684,307 | Germany | Nov. 25, 1939 |
| 387,887 | Great Britain | Feb. 16, 1933 |
| 69,641 | Austria | Aug. 25, 1915 |
| 698,338 | Germany | Nov. 7, 1940 |